US005233877A

United States Patent [19]

Campbell

[11] Patent Number: 5,233,877

[45] Date of Patent: Aug. 10, 1993

[54] STARTER DRIVE GEAR

[76] Inventor: Robert M. Campbell, 2101 Spence Pl., Knoxville, Tenn. 37920

[21] Appl. No.: 950,397

[22] Filed: Sep. 23, 1992

[51] Int. Cl.[5] ........................ F02N 15/02; F16D 13/04

[52] U.S. Cl. ........................................ 74/7 C; 74/7 E; 192/42

[58] Field of Search .................... 74/6, 7 R, 7 C, 7 E; 192/41 A, 42, 45.1

[56] References Cited

U.S. PATENT DOCUMENTS

| | | | |
|---|---|---|---|
| 1,320,460 | 11/1919 | Ellett | 427/13 |
| 1,867,302 | 7/1932 | Baldwin | 192/42 |
| 2,192,434 | 3/1940 | Critchfield | 29/159.2 |
| 2,211,053 | 8/1940 | Critchfield | 74/6 |
| 2,492,550 | 12/1949 | Bolles et al. | 74/6 |
| 2,523,151 | 9/1950 | Schneider et al. | 74/6 |
| 2,706,413 | 4/1955 | Mendenhall | 74/7 R |
| 2,871,708 | 2/1959 | Raver | 74/6 |
| 2,904,148 | 9/1959 | Schneider et al. | 192/45.1 |
| 2,951,570 | 9/1960 | Antrim, Jr. et al. | 192/101 |
| 2,991,779 | 7/1961 | Barr | 123/179.27 |
| 3,498,429 | 3/1970 | Frakes | 192/45.1 |
| 3,814,233 | 6/1974 | Toulier | 192/46 |
| 4,291,795 | 9/1981 | Charchian et al. | 192/45.1 X |

FOREIGN PATENT DOCUMENTS

| | | |
|---|---|---|
| 530 | 11/1899 | Austria . |
| 265999 | 12/1911 | Fed. Rep. of Germany . |
| 349252 | 5/1931 | United Kingdom . |
| 2193543 | 2/1988 | United Kingdom . |

*Primary Examiner*—Allan D. Herrmann
*Assistant Examiner*—David W. Laub
*Attorney, Agent, or Firm*—Luedeka, Hodges, Neely & Graham

[57] ABSTRACT

The specification discloses a starter drive for starting engines. In one embodiment, a drive gear having a recess on a side thereof transfers motion from a starting motor to a sprag and a rim located in the recess. The rim is integrally formed with an idler gear which in turn transfers its motion to the crankshaft of the engine. After startup, the sprag permits the idler gear and rim to turn independently of the drive gear.

4 Claims, 1 Drawing Sheet

STARTER DRIVE GEAR

FIELD OF THE INVENTION

This invention relates generally to engine starter drives and more particularly to engine starter drives for internal combustion aircraft engines.

BACKGROUND

Conventional starting drive gears for small, single engine aircraft typically include a drive gear which rotates in response to the starting motor to turn a smaller diameter shaft which is welded to and projects from the center of the drive gear. The shaft is surrounded at its opposite end by a sprag arrangement and an idler gear. Thus, in this arrangement, a relatively small diameter shaft is used to turn the idler gear. This type of arrangement typically has a short life span as a result of rapid deterioration of the sprag. This deterioration is believed to be caused by the stresses placed upon the sprag in transferring rotation from the small shaft to the larger idler gear.

For example, it has been applicant's experience that the starter drive gear for a Cessna 150 has a life of about 350 hours when used extensively by student pilots, whereas the engine time between overhauls is about 2000 hours. Thus, such engine uses about six starter drive gears before an overhaul is needed. Having a starter drive fail in a Cessna 150 is most undesirable because it is connected directly to the crankshaft. If the starter drive freezes, it will try to rotate the starter motor and will likely destroy it, as well. If a starter gear fails when the engine is idling, as on the short-final leg of a landing, the starter gear may stop an engine. This is most disconcerting to any pilot, and especially to student pilots who frequently fly Cessna 150 airplanes. Also, during training exercises, engines are often intentionally turned off. If the starter drive has failed, the engine may be difficult to restart. For all of these reasons, the failure rate of conventional starter drives is not acceptable, and a more reliable mechanism is needed.

It is an object of the present invention to provide a new and improved engine starter drive.

Another object of the present invention is to provide an engine starter drive of the character described which allows the starter motor to more easily turn the crankshaft of the engine to be started.

Still another object of the present invention is to provide an engine starter drive of the character described which is uncomplicated in configuration.

SUMMARY OF THE INVENTION

Having regard to the foregoing and other objects, the present invention is directed to a starter drive gear which comprises a starter for an engine, comprising a drive gear rotatable in response to a force applied thereto, the drive gear defining a recess for receiving a sprag and a rim integrally formed with an idler gear. The sprag transfers rotation of the drive gear to the rim and the idler gear to accomplish startup of the engine and the sprag permits the idler gear and rim to turn independent of the drive gear during operation of the engine.

BRIEF DESCRIPTION OF THE DRAWINGS

The above and other features and advantages of the present invention will become apparent upon reading the following detailed description and when considered in accordance with the appended claims and accompanying drawing which is a longitudinal cross-sectional view of a preferred embodiment of the present invention.

DETAILED DESCRIPTION

Figure 1:
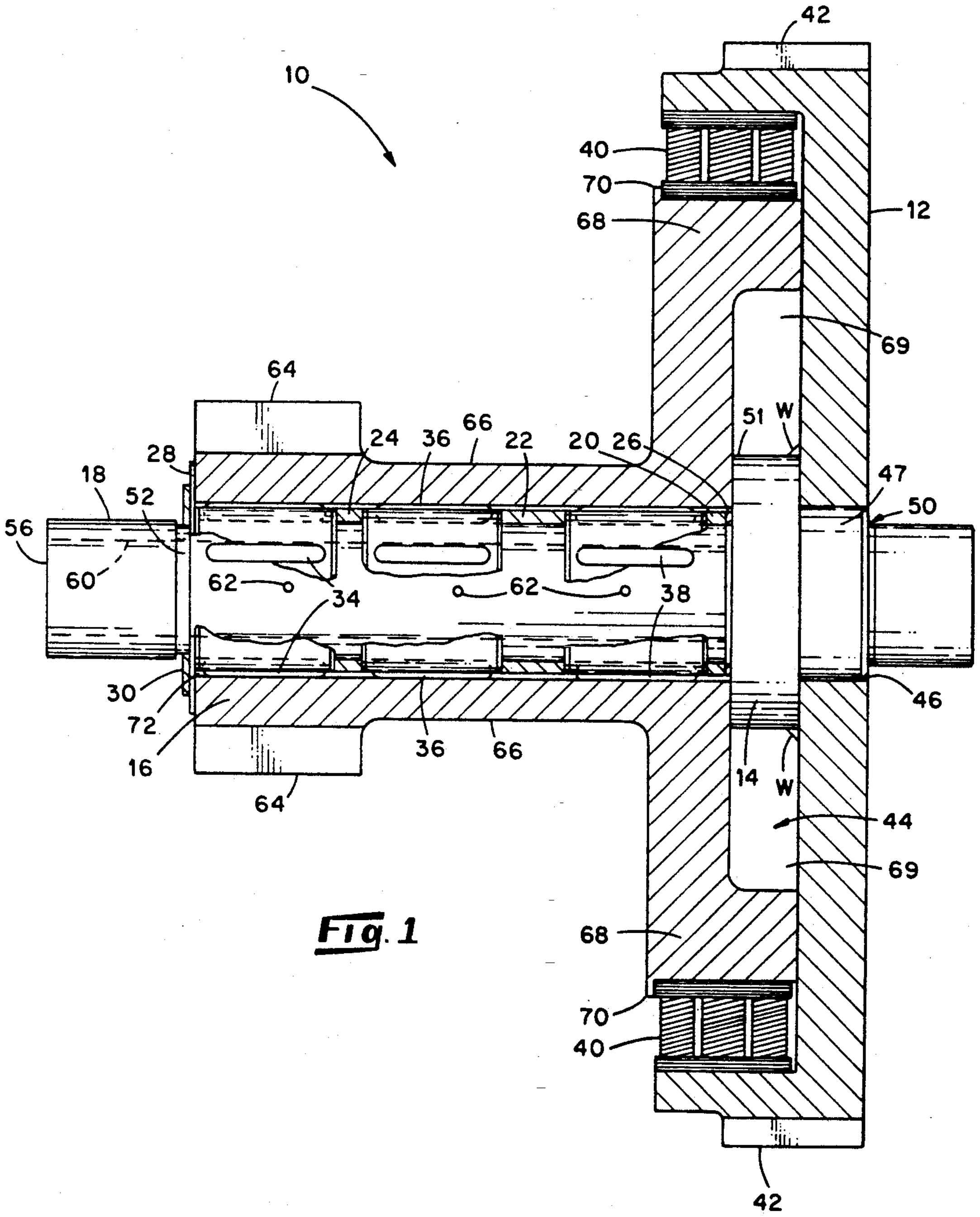

With reference now to FIG. 1, there is shown a starter drive gear assembly 10 within which features of the present invention are embodied. The assembly 10 includes a drive gear 12, a bushing 14, an idler gear 16, a central shaft 18, spacers 20, 22 and 24, washers 26 and 28, retaining ring 30, needle bearings 34, 36 and 38, and annular sprag assembly 40. The drive gear, idler gear, and rim are mounted for rotation about the longitudinal axis of the shaft. Each of the above components is preferably formed of a durable material, such as hardened steel.

The drive gear 12 is a circular gear having sixty-three teeth 42 uniformly spaced around the periphery thereof to mesh with a gear connected to the output shaft of a starter motor. The teeth 42 have a tooth form of 14½° inv and a pitch of 16. The gear 12 preferably has an outer diameter of about 3.73 inches (4 inches tooth-to-tooth) and a thickness of about 0.863 inches.

A circular recess in the form of a blind bore 44 is defined on one side of the gear 12 and the opposite side of gear 12 is flat. The blind bore preferably extends to a depth of about 0.628 inches. An opening 46 extends from the center of the blind bore 44 to the opposite flat side of the drive gear 12 and is sized to a diameter of about 0.621 inches to fittingly receive a lower end 47 of the bushing having an outer diameter of about 0.6225 inches.

An opening 50 extends through the bushing 14 for insertion of the shaft therethrough. An upper end 51 of the bushing is connected to the bottom of the blind bore 44 such as by welding at weld points W. The upper end as shown has a diameter of about 1.0 inch. The bushing 14 is positioned so that the opening 50, which is dimensioned to fittingly receive the shaft, is aligned with the opening 46 and the lower end 47 is fittingly received within the opening 46. The bushing may be integrally connected to the shaft, such as by welding, so that the shaft 18 and bushing provide a unitary structure.

The shaft 18 has a total length of about 3.377 inches and includes an annular groove 52 defined on the outer surface thereof about 0.532 inches from the end 56 of the shaft for engagingly receiving the retainer ring 30. A blind bore 60 having a depth of about 2.4 inches is defined at the open end of the shaft and a plurality of openings 62 having a diameter of about 0.062 inches extend from various positions on the outer surface of the shaft 18 to the interior of the blind bore 60 to permit oil or other lubricant to be directed through the bore 60 of the shaft to the needle bearings 34, 36 and 38 which are positioned on the shaft 18.

The idler gear 16 has twelve teeth 64 uniformly spaced around the periphery thereof to mesh with a gear connected to the crankshaft of the engine to be started. The teeth have a tooth form of 14 1/6° inv and a pitch of 10. The idler gear has a diameter (tooth-to-tooth) of about 1.379 inches and a length or height of about 0.594 inches. A tubular shaft 66 extends axially from the idler gear and a large rim 68 is provided on the other end of the tubular shaft 66. The rim 68 is U-shaped in cross-section and is larger in diameter than the idler gear 16, but smaller in diameter than the inner diameter of the sprag, and is seated within the blind bore 44 of the drive gear 12 adjacent and in close contact with the annular sprag assembly 40. The rim 68 preferably has an outer diameter of about 3.092 inches and the "U" of the rim provides an annular cavity 69 having a depth of about 0.250 inch and a diameter of about 2.190 inches. The overall length of the idler gear 16, shaft 66, and rim 68 is about 2.155 inches. The shaft 66 has a length of about 0.948 inches and the rim 68 has a length or height of about 0.661 inches. The idler gear, shaft, and rim are preferably machined from a single piece of hardened steel so as to provide a unitary structure.

The sprag assembly 40 is annularly disposed adjacent the inner wall of the blind bore 44 and the outer diameter of the rim 68. A lip 70 defined on the upper peripheral edge of the rim 68 adjacent the shaft 66 and having a thickness of about 0.13 inches abuts the annular exposed surface of the sprag assembly in the in the constructed assembly. The sprag assembly is preferably manufactured by Borg Warner as part 13243-A.

A channel 72 having a diameter of about 0.625 inches is centrally formed to extend through the length of the unitary structure provided by the idler gear 16, shaft 66, and rim 68 for receiving the shaft 18 therethrough while providing sufficient clearance for the spacers 20, 22, and 24 and the needle bearings 34, 36, and 38. The spacers 20 and 24 have an outer diameter of about 0.592 inches, an inner diameter of about 0.502 inches, and a width of about 0.088 inches. The spacer 22 has the same diametric dimensions and a width of about 0.216 inches.

The assembly is constructed by first inserting the shaft 18 and the bushing 14, which as previously explained is preferably of unitary structure, so that the lower end 47 of the bushing is fittingly received within the opening 46. This may be accomplished, for example, by heating the drive gear 12 to expand the opening prior to insertion of the lower end 47 followed by cooling after insertion to contract the opening 46. The upper end 51 of the bushing is then welded to the bottom of the bore 44, as at weld points W, to secure the bushing 14 and shaft 18 to the gear 12 so that the shaft 18 extends outwardly of and perpendicular to the bore 44. For ease of construction, the gear 12 is preferably turned with its flat side down at this point so that the shaft extends upwardly.

The washer 26, which is preferably made of bronze and has an outer diameter of about 1.0 inch, an inner diameter of about 0.5 inch, and a thickness of about 0.032 inches, is slid over the upper end 56 of the shaft 18 and positioned adjacent the upper end 51 of the bushing. The spacer 20 is likewise slid over the shaft 18 and positioned over the washer followed, in order, by the needle bearing 34, spacer 22, needle bearing 36, spacer 24, and needle bearing 38.

Following this, the rim 68 is inserted into the center of the sprag assembly 40 with the lip 72 against the upper peripheral edge of the sprag assembly. The thus constructed sprag 40 and rim 68 assembly is inserted into the blind bore 44, such as may be accomplished with known sprag assembly installation equipment, so that the channel 72 surrounds the shaft 18 and the spacers and needle bearings mounted on the shaft. The washer 28 is then placed over the end of the shaft 18 and against the outer surface of the idler gear so that it is positioned just below the annular groove 52 on the shaft. The retainer ring 30 is then positioned within the annular groove 52 to complete construction.

When starting an engine, the electric starter motor rotates an output shaft and associated gear which meshes with the teeth 42 of the drive gear 12 to rotate the drive gear, for example, in a counter-clockwise direction. The sprag assembly 40 rotates in the same manner as the drive gear and transfers force from the drive gear 12 to the rim 68 (and hence to the shaft 66 and idler gear 16) to turn the rim 68 in the same direction as the drive gear, while also preventing the rim 68 from turning opposite the drive gear (i.e. clockwise). The idler gear 16, which turns with the rim 68, then transfers the motion imparted to it by the drive gear to the crankshaft of the engine to be started, via the teeth 64, in response to drive motion of the starter motor. Upon startup of the engine, the crankshaft turns in the direction of motion of the idler gear, but at a rotational rate much faster than the speed of the idler gear. The crankshaft transfers this motion to the idler gear (and hence to the rim) such that the idler gear and rim turn with the crankshaft. The sprag assembly 40 allows the idler gear and rim to turn freely in this direction independent of the drive gear 12 during operation of the engine.

The present invention provides an improved starter drive gear assembly which offers improved life over conventional starter drive gears. Increased life results from reduced the stresses on the sprag assembly by providing an arrangement wherein the sprag transfers motion from a large diameter drive gear to a rim which has a diameter which is only slightly smaller than that of the drive gear. The rim is connected via a shaft to the smaller diameter idler gear so that the idler gear turns with the rim. This increases the torque exerted by the sprag assembly such that the starter motor may more easily turn the crankshaft with reduced stresses on the sprag assembly.

The foregoing description of certain embodiments of the present invention has been provided for purposes of illustration, and it is understood that numerous modifications or alterations may be made without departing from the spirit and scope of the invention as defined in the following claims.

What is claimed is:

1. A starter drive gear for aircraft, comprising:

a circular drive gear having a thickness, an outer diameter, a plurality of teeth formed on the outer diameter, and rotatable in response to a rotational force applied to said teeth, said drive gear having a first side defining a circular blind bore having an inner cylindrical bore surface having a width that is smaller than the thickness of the drive gear and a diameter that is smaller than the diameter of the drive gear;

a circular opening extending through the center of the circular blind bore, said circular opening having a diameter that is smaller than the diameter of the circular bore;

a central shaft fixedly received within the circular opening and extending outwardly of the circular blind bore, said central shaft having a diameter substantially equal to the diameter of the circular opening;

an annular sprag assembly having an outer diameter fittingly received within the circular blind bore and an inner diameter that is larger than the central shaft; and a circular rim integrally formed with an elongate tubular shaft and a circular drive gear, said circular rim having a diameter slightly smaller than but substantially equal to the inner diameter of the sprag and a thickness substantially equal to the depth of the blind bore, said rim being seated within the blind bore adjacent to and in close contact with the inner diameter of the sprag for rotation about the central shaft, said elongate tubular shaft being rotatably mounted on said central shaft and having a diameter that is smaller than the diameter of the circular rim, said tubular shaft being integrally formed with and extending outwardly from said rim in a direction away from said drive gear and parallel to said central shaft, and said circular idler gear being rotatably mounted on the central shaft and having a diameter that is larger than the diameter of the tubular shaft and less than one half the diameter of the circular rim, said idler gear being integrally formed with said tubular shaft opposite said rim.

2. The gear of claim 1, wherein the outer diameter of said circular drive gear is about 4 inches, the thickness of said circular drive gear is about 0.8 inches, and the width of said inner cylindrical bore surface is about 0.6 inches.

3. The gear of claim 2, wherein the diameter of the circular opening is about 0.6 inches.

4. The gear of claim 1, wherein the diameter of the circular rim is about 3.0 inches and the diameter of the idler gear is about 1.3 inches.

* * * * *